US008566241B2

(12) United States Patent
Ostler

(10) Patent No.: US 8,566,241 B2
(45) Date of Patent: Oct. 22, 2013

(54) DEPOSIT PENDING CHECK CLEARANCE

(75) Inventor: Randall Scott Ostler, Miami, FL (US)

(73) Assignee: Viamericas Corporation, Bethesda, MD (US)

( * ) Notice: Subject to any disclaimer, the term of this patent is extended or adjusted under 35 U.S.C. 154(b) by 0 days.

(21) Appl. No.: 13/281,529

(22) Filed: Oct. 26, 2011

(65) Prior Publication Data

US 2013/0110713 A1 May 2, 2013

(51) Int. Cl.
*G06Q 40/00* (2012.01)
*G06K 5/00* (2006.01)

(52) U.S. Cl.
USPC ............................................. 705/41; 235/380

(58) Field of Classification Search
None
See application file for complete search history.

(56) References Cited

U.S. PATENT DOCUMENTS

| | | | |
|---|---|---|---|
| 6,507,644 B1* | 1/2003 | Henderson et al. | 379/114.2 |
| 6,615,190 B1* | 9/2003 | Slater | 705/41 |
| 7,204,412 B2* | 4/2007 | Foss, Jr. | 235/380 |
| 7,280,984 B2* | 10/2007 | Phelan et al. | 705/76 |
| 7,668,751 B2* | 2/2010 | Baumgartner et al. | 705/17 |
| 8,060,420 B2* | 11/2011 | Vardi | 705/35 |
| 8,082,195 B2* | 12/2011 | Enzaldo | 705/30 |
| 2003/0200180 A1* | 10/2003 | Phelan et al. | 705/65 |
| 2003/0225689 A1* | 12/2003 | MacFarlane et al. | 705/39 |
| 2005/0049950 A1* | 3/2005 | Johnson | 705/35 |
| 2005/0080728 A1* | 4/2005 | Sobek | 705/39 |
| 2005/0086168 A1* | 4/2005 | Alvarez et al. | 705/41 |
| 2006/0036496 A1* | 2/2006 | Cowell et al. | 705/14 |
| 2006/0213978 A1* | 9/2006 | Geller et al. | 235/380 |
| 2006/0213979 A1* | 9/2006 | Geller et al. | 235/380 |
| 2006/0213980 A1* | 9/2006 | Geller et al. | 235/380 |
| 2007/0095894 A1* | 5/2007 | Kerridge | 235/379 |
| 2007/0168283 A1* | 7/2007 | Alvarez et al. | 705/43 |
| 2007/0267480 A1* | 11/2007 | Hansen et al. | 235/379 |
| 2009/0006251 A1* | 1/2009 | Haase et al. | 705/40 |
| 2012/0246069 A1* | 9/2012 | Edwards et al. | 705/42 |

OTHER PUBLICATIONS

Poindexter, Obrea; Ruff, Sean, "Electronic Banking and Prepaid Card Developments", The Business Lawyer 64.2 (Feb. 2009): pp. 1-6.*
Rinearson, Judith, "Prepaid Cards at a Crossroads", The Review of Banking & Financial Services 1.1 (Jan. 2005), pp. 1-5.*
Barr, Michael S., "Banking the Poor", Yale Journal on Regulation 21.1 (Winter 2004), pp. 1-72.*

* cited by examiner

*Primary Examiner* — Mohammad Z Shaikh
(74) *Attorney, Agent, or Firm* — MH2 Technology Law Group, LLP

(57) ABSTRACT

Systems and methods for processing checks are described. In particular, an individual can submit a check to a check casher entity, in exchange for a stored-value card (SVC) with an associated pending deposit to be made available on a specified date. The check casher entity can provide the check to a check processor, which can process the check. If the specified date is reached without any problems with processing the check, then the pending deposit on the SVC can be made available to the individual. If the check bounces, then the pending deposit is not made available on the SVC. According to implementations, the SVC processing can be handled by an SVC processor entity.

14 Claims, 7 Drawing Sheets

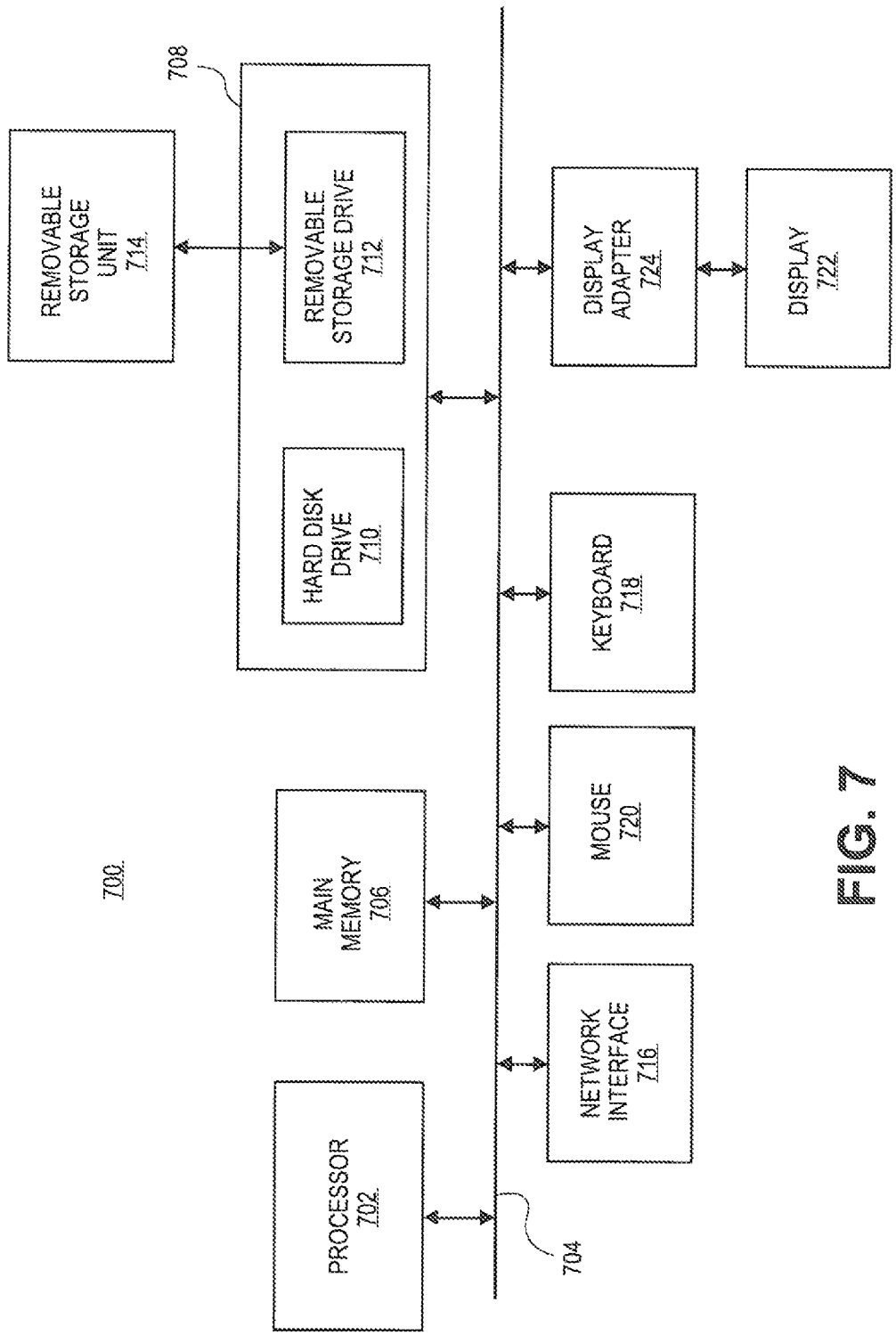

DEPOSIT PENDING CHECK CLEARANCE

FIELD

This invention generally relates to systems and methods for processing transactions. More particularly, this invention relates to platforms and techniques for processing financial check instruments.

BACKGROUND

Check cashers are entities, agencies, and the like that can monitize third party checks. Some individuals lack a conventional bank account, and thus need to convert any possessed checks into cash via a check casher. The check casher charges the individual a fee or other forms of consideration for providing the check cashing service as well as for taking the risk that the check might bounce due to insufficient funds, fraud, and/or other factors.

For check cashers, the risk of default on checks is high. Until the check casher successfully retrieves the funds from the individual, the risks associated with the loss of the funds as well as returned check fees charged by the check processor are the responsibility of the check casher. Further, check defaults of the check casher increase the risk to the check processor in that unexpected check returns can unexpectedly cause the check casher to exceed a line of credit already extended to the check casher. To reduce default risk, some check cashers will "hold" the funds of a check whereby the individual is required to return to the check casher to receive the funds after the check casher believes that the risk of default has passed.

A need therefore exists for systems and methods to reduce check processing risk. More particularly, a need exists for platforms and techniques for reducing the risks associated with check default and for reducing the overall cost of the check cashing process for the check casher and/or the individual.

SUMMARY

Implementations are directed to systems and methods for check processing. According to implementations in one regard, an indication of a check submitted by a customer to the check casher entity can be received from the check casher entity. Further, a request for a pending deposit to be placed on a card provided to the customer by the check casher entity can also be received. A card processor entity can be notified of the pending deposit to be placed on the card and a specified date on which the pending deposit will be available. Further, the pending deposit can be processed by a processor.

According to implementations in another regard, a system for check processing is disclosed. The system comprises a processor and a computer readable storage medium coupled to the processor. The computer readable storage medium comprises instructions for causing the processor to receive, from a check casher entity, an indication of a check submitted by a customer to the check casher entity, and a request for a pending deposit to be placed on a card provided to the customer by the check casher entity. Further, the processor notifies a card processor entity of the pending deposit to be placed on the card and a specified date on which the pending deposit will be available, and processes the pending deposit.

According to implementations in another regard, a check comprising an amount payable can be received from a customer. Further, a card indicating a pending deposit amounting to some or all of the amount payable, and an indication of a date on which the pending deposit will be made available, can be provided to the customer. Still further, an indication of the check can be submitted to a check processor entity, wherein the pending deposit associated with the card is processed according to a processing of the check by the check processor entity.

BRIEF DESCRIPTION OF THE DRAWINGS

The accompanying drawings, which are incorporated in and constitute a part of this specification, illustrate implementations of the present disclosure and together with the description, serve to explain the implementations.

FIG. 7 illustrates an exemplary hardware configuration of a component used in processing data according to various implementations.

DETAILED DESCRIPTION

Figure 1:
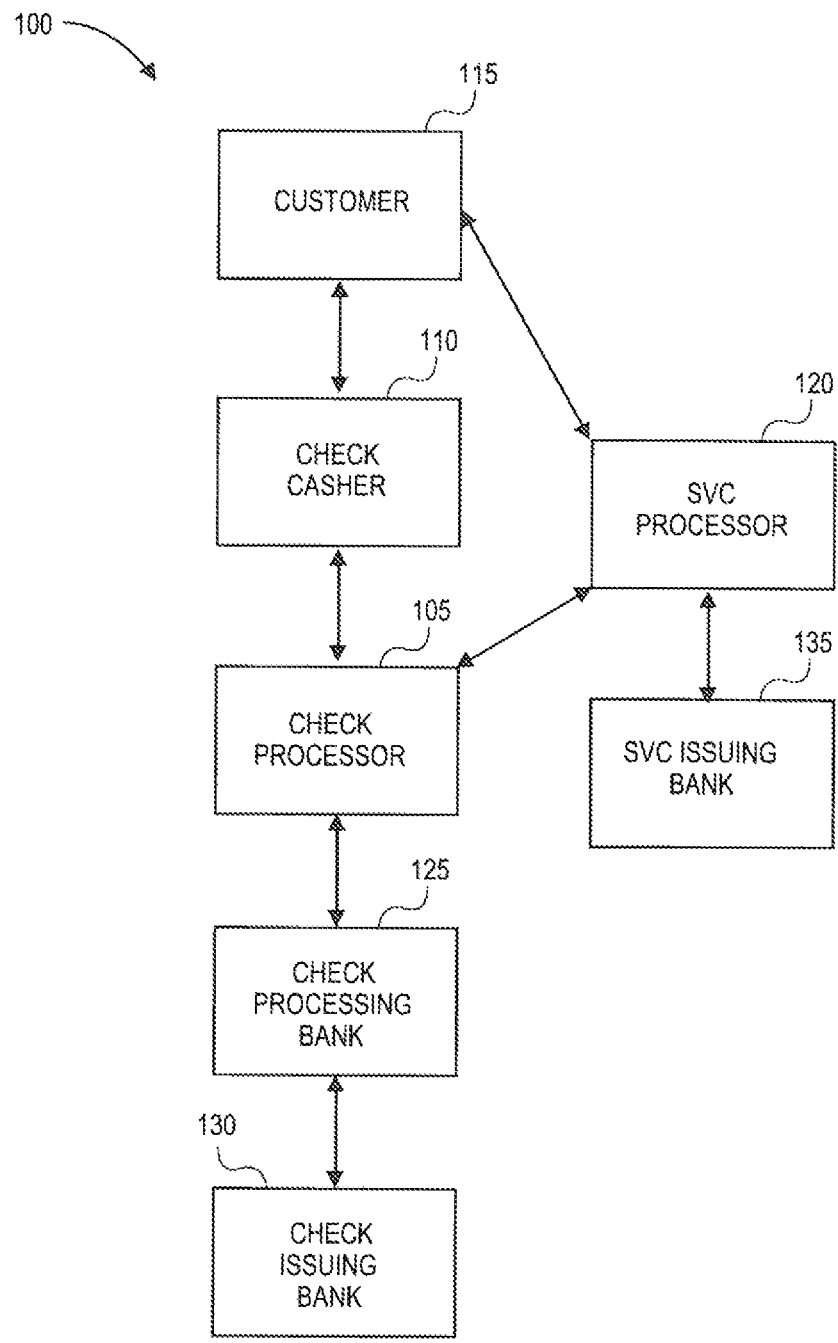
FIG. 1 illustrates a functional block diagram of an exemplary check processing environment according to various implementations.

Implementations are directed towards systems and methods for processing checks. In particular, a check processing system can comprise one or more check cashers, check processors, and stored-value card (SVC) processors. When a customer wishes to cash a third-party check at a check casher, the check casher can provide an SVC to the customer. In implementations, the SVC has an associated pending deposit equal to some or all of the amount payable specified by the check. Further, the SVC can indicate a specified date on which the pending deposit can be made available to the customer.

The check casher can submit an indication of the check to a check processor, which can be configured to process the check. The check processor can submit the indication of the check to a check processing bank, and can notify the SVC processor of the pending deposit associated with the customer. If there are any problems with the check (e.g., the check "bounces" when submitted to a check issuing bank), then the check processor can inform the SVC processor to reverse or otherwise not avail the pending deposit on the SVC to the customer. In contrast, if the specified date is reached without any problems processing the check, then the check processor can submit an instruction to the SVC processor to reverse the pending load on the SVC, and submit an immediate load with the amount of the pending deposit.

As used herein, a stored-value card (SVC) can refer to any type of card, note, and/or the like with a monetary value associated therewith, such as via data physically stored on the SVC. The value associated with the SVC can be accessed, for example, using a magnetic stripe embedded in the card, via radio-frequency identification, by entering a code number, or via other processes or techniques. It should be appreciated that other monetary products, items, or instruments can be used in addition to or in place of SVCs in the systems and methods as described herein such as, for example, prepaid cards, gift cards, debit cards, electronic money, and others.

The systems and methods as described herein can reduce or eliminate the risk of default for the check casher, as the funds associated with an amount payable can be made available when a specified date is reached without the check defaulting. Further, the systems and methods as described herein can reduce or eliminate the risk associated with a check processor, as immediate credit can be given for a check cashed with a pending check clearance. As a result, the check casher can cash checks amounting to more than an amount available to the check casher, and the check casher can cash checks beyond a credit limit of the check casher, as the checks are protected from default risk. Further, the customer cashing the check can be made aware of the delayed availability of the funds, as well as the pending status of the funds via an SVC card provided to the customer, so that the transaction with the check casher can be completed without requiring a subsequent visit of the customer, or requiring the customer to trust the integrity of the check casher.

Reference will now be made in detail to exemplary implementations of the disclosure examples of which are illustrated in the accompanying drawings. Wherever convenient, the same reference names and numbers will be used throughout the drawings to refer to the same or like parts.

In the following description, reference is made to the accompanying drawings that form a part thereof, and in which is shown by way of illustration-specific exemplary implementations. These implementations are described in sufficient detail to enable those skilled in the art to practice the implementations, and it is to be understood that other implementations can be used and that changes can be made without departing from the scope of this disclosure. The following description is, therefore, merely exemplary.

FIG. 1 illustrates a block diagram of an exemplary check processing environment 100 consistent with various implementations. It should be appreciated that each of the components of the environment 100 can comprise one or multiple entities. As shown in FIG. 1, the environment 100 can comprise a customer 115 and a check casher 110. The customer 115 can be any individual, group of individuals, or other entity, in possession of a check. For example, the check can be any document or instrument that can order a payment of money from a bank account. The entity issuing the check (the "drawer") can have an account, such as a checking account, in which money is deposited. The drawer can write the check with various details (e.g. money amount, date, payee, etc.) that can order a bank of the drawer to pay the money amount to the payee when the payee redeems, or cashes, the check.

According to implementations, the customer 115 can tiring a check to the check casher 110 for processing and/or payment. The check casher 110 can be any business, individual, corporation, agency, or any other type of entity that can receive checks from customers and provide cash or cash equivalents to the customers upon receipt of and/or in exchange for the check. For example, the check casher 110 can be a money transfer agent that can be used in remittance payments. In exchange for providing cash or cash equivalents to the customers, the check casher 110 can withhold a fee from the customer, and/or charge other forms of consideration. For example, if the money amount of a check brought to the check casher 110 by the customer 115 is $50, then the check casher 110 can provide $48 to the customer 115 and keep $2 as a fee. It should be appreciated that the fees charged by the check casher 110 can vary. The check casher 110 can be equipped with resources in compliance with the Check 21 Act, which allows the recipient of the original check to create a digital version of the original check, thereby eliminating the need for further handling of the original check. For example, the check casher 110 can be configured with a scanner or other imaging device(s) to create an electronic version, such as an image(s), of a check received from the customer 115.

The environment 100 can further comprise a check processor 105 that can be a business, individual, corporation, or other type of entity that can be configured to interface or otherwise communicate with the check casher 110, or other entities of the environment 100. The check processor 105 and the check casher 110 can be configured to exchange data via any type of wired or wireless network or data connection. For example, the check casher 110 can be configured to send, to the check processor 105, an electronic version of a check received from the customer 115. The check processor 105 can further be configured to interface or otherwise communicate with a check processing bank 125. In implementations, the check processing bank 125 can be any institution, company, or other entity that can be configured to receive checks or indications of checks, and submit the checks to other banks or entities. For example, the check processing bank 125 can employ Check 21 functionalities, can be an automated clearing house (ACH), or can implement other techniques.

The environment 100 can further comprise a check issuing bank 130 that can be any institution, company, or other type of entity that can be configured to interface or otherwise communicate with the check processing bank 125, or other entities. In implementations, the check issuing bank 130 can be the bank of the drawer of a check. For example, if a drawer writes a check to a payee for $100, then, in processing the check, an account of the drawer at the check issuing bank 130 can be deducted by $100. In implementations, the check processing bank 125 can be configured to provide a check or an indication of a check to the check issuing bank 130. Further, as discussed herein, the check issuing bank 130 can be configured to reverse credits associated with the entities of the environment 100 if a check fails to process or the check "bounces," such as if insufficient funds exist in an associated account of the drawer or if the instrument is fraudulent and/or has no corresponding account.

According to implementations, the environment 100 can further comprise a stored-value card (SVC) processor 120 that can be any type of company, individual, institution, or other type of entity. The SVC processor 120 can be configured to interface or otherwise communicate with the check processor 105, the customer 115, and/or other entities of the environment 100. In implementations, the SVC processor 120 can be separate from or a part of one or more entities of the environment 100. For example, the check processor 105 can comprise resources or components configured to initialize and/or implement the functionalities of the SVC processor 120.

The SVC processor 120 can establish a system or technique to process SVCs provided to the customers 115. In particular, the SVC processor 120 can process balance inquiries from the customer 115, as well as the availing of funds on the SVCs provided to the customer 115. Further, the SVC processor 120 can be configured to interface or otherwise communicate with an SVC issuing bank 135 that can maintain accounts associated with the check processor 105, the customer 115, and/or other entities. The SVC issuing bank 135 can be any type of company, individual, institution, or other type of entity.

It should be appreciated that the SVC processor 120 can process other types of cash equivalents to the customer 115 such as, for example, a debit card, a gift card, a prepaid credit card, and/or other closed, semi-closed, or open system cards.

The SVCs processed by the SVC processor 120 can physically store data relating to the funds available or pending on the SVCs. The customers 115 can use the funds to the SVCs to purchase goods or services from merchants or other entities, as understood in the art.

According to implementations, when the customer 115 submits a check to the check casher 110, the check casher 110 can be configured to provide an SVC to the customer 115 with a pending deposit amounting to some or all of the money amount of the check. Further, the SVC can specify a date on which the pending deposit can be made available. If the specified date is reached without any problems with processing the check (e.g., if the check does not "bounce"), then the SVC processor 120 can avail the pending deposit on the SVC provided to the customer 115. More particularly, the check processor 105 can submit a card load instruction to the SVC processor 120, and the SVC processor 120 can issue a load instruction to the SVC issuing bank 135. In contrast, if the check does not clear, then the pending deposit on the SVC is not made available, and any associated account credits of the entities of the environment 100 can be reversed.

Figure 2:
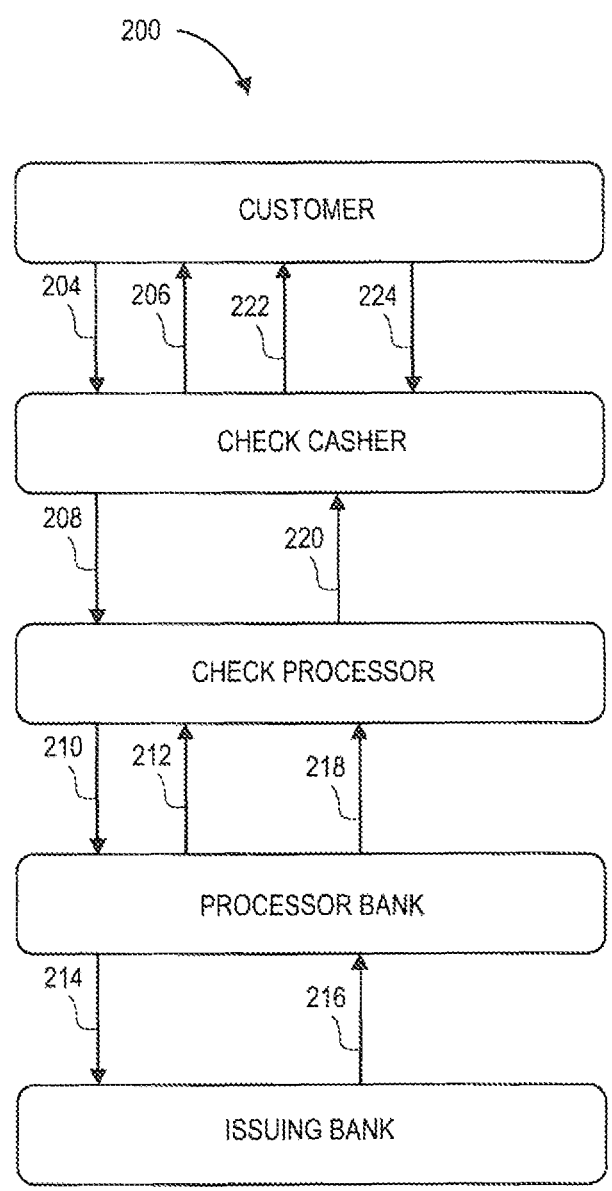
FIG. 2 is a flow diagram illustrating a check processing technique according to various implementations.

FIG. 2 illustrates an exemplary process 200 used in some check cashing transactions. In particular, the process 200 of FIG. 2 details an existing technique of cashing a check by an individual. It should be apparent to those of ordinary skill in the art that the diagram depicted in FIG. 2 represents a generalized illustration and that other processing may be added or existing processing can be removed or modified.

The process 200 begins at 204, when an individual can submit a check to a check casher. For instance, the individual can take a third party check into a check cashing entity. In some implementations, the customer can submit check information, information about the customer, and/or other information, to be verified and/or compared to known bad checks, customers, or other suspect transactions. In 206, the check casher can deduct a fee and return the money amount of the check to the individual. In 208, the check casher can submit the check to a check processor, which can credit an account of the check casher with the money amount of the check. For example, the check casher can submit an image of the check to the check processor. In 210, the check processor can submit the check to a processor bank. In implementations, the processor bank can be equipped with "Check 21" capabilities.

In 212, the processor bank can credit the check processor for the money amount of the check. In 214, the processor bank can submit the check to an issuing bank which can credit the processor bank for the money amount of the check. If there are no problems with the check, then the transaction can complete and the processing can end. If, however, there are any problems with the check, then in 216, the issuing bank can return the check to the processor bank and reverse the credit amount applied to the processor bank. For example, the check can "bounce" if the drawer of the check has insufficient funds in an applicable account. In 218, the processor bank can inform the check processor of the returned check and can reverse the credit amount applied to the check processor. In 220, the check processor can inform the check casher of the returned check and can reverse the credit amount applied to the check casher. In 222, the check casher can attempt to locate the customer to return the check. If the customer is found, then in 224, the customer can return the cash received from the check casher and can pay any associated returned check fees.

Figure 3:
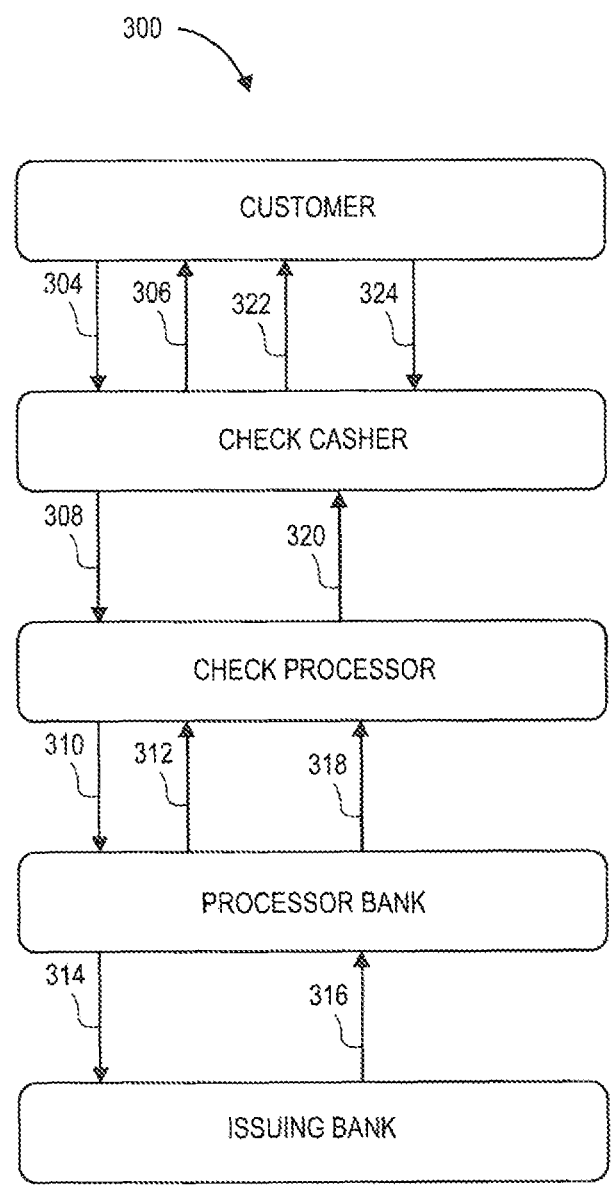
FIG. 3 is a flow diagram illustrating a check processing technique according to various implementations.

FIG. 3 illustrates an exemplary process 300 used in other check cashing transactions. In particular, the process 300 of FIG. 3 details another existing technique of cashing a check by an individual. Further, the process 300 comprises processing associated with holding funds until a check processes or clears. It should be apparent to those of ordinary skill in the art that the diagram depicted in FIG. 3 represents a generalized illustration and that other processing may be added or existing processing can be removed or modified.

The process 300 begins at 304, where an individual can submit a check to a check casher. For instance, the individual can take a third party check into a check cashing entity. In 306, the check casher can deduct a fee and return a portion of the money amount of the check to the individual. Further, the check casher can hold a balance of the money amount for a specified length of time necessary to determine if and/or when the check will "bounce" or be cleared. In implementations, the specified length of time can be a set or varied amount, or can be triggered once a result (e.g. cleared or bounced) is known. Further, the check casher can provide no money to the customer and can place the full money amount on hold. In 308, the check casher can submit the check to a check processor, which can credit an account of the check casher with the money amount of the check. For example, the check casher can submit an image of the check to the check processor. In 310, the check processor can submit the check to a processor bank. In implementations, the processor bank can be equipped with "Check 21" capabilities.

In 312, the processor bank can credit the check processor for the money amount of the check. In 314, the processor bank can submit the check to an issuing bank which can credit the processor bank for the money amount of the check. If there are any problems with the check, then in 316, the issuing bank can return the check to the processor bank and reverse the credit amount applied to the processor bank. For example, the check can "bounce" if the drawer of the check has insufficient funds in an applicable account. In 318, the processor bank can inform the check processor of the returned check and can reverse the credit amount applied to the check processor. In 320, the check processor can inform the check casher of the returned check and can reverse the credit amount applied to the check casher. In 322, the customer can return to the check casher in an attempt to retrieve the balance of the funds, and the check casher can notify the customer that the check did not process. In 324, the customer can return the portion of the money amount to the check casher. Further, the customer can pay any associated returned check fees.

The processes 200, 300 of FIGS. 2 and 3 have many drawbacks, however. In particular, in the process 200, the check casher holds all of the risk if a check fails to process and the check casher cannot locate the customer and/or get the customer to return the funds. Further, in the process 300, the check casher holds some risk if a check fails to process and the customer does not return the portion of the check already provided to the customer. In addition, the customer holds some risk if the check fails to process and the check casher will not abscond with the remainder of the funds. Moreover, in the process 300, the customer is required to return to the check casher to obtain the remainder of the funds. Still further, current risk reduction strategies, such as database checks, do not always identify fraud with recent accounts or can otherwise be inaccurate, and third parties can charge fees for the service.

Figure 4:
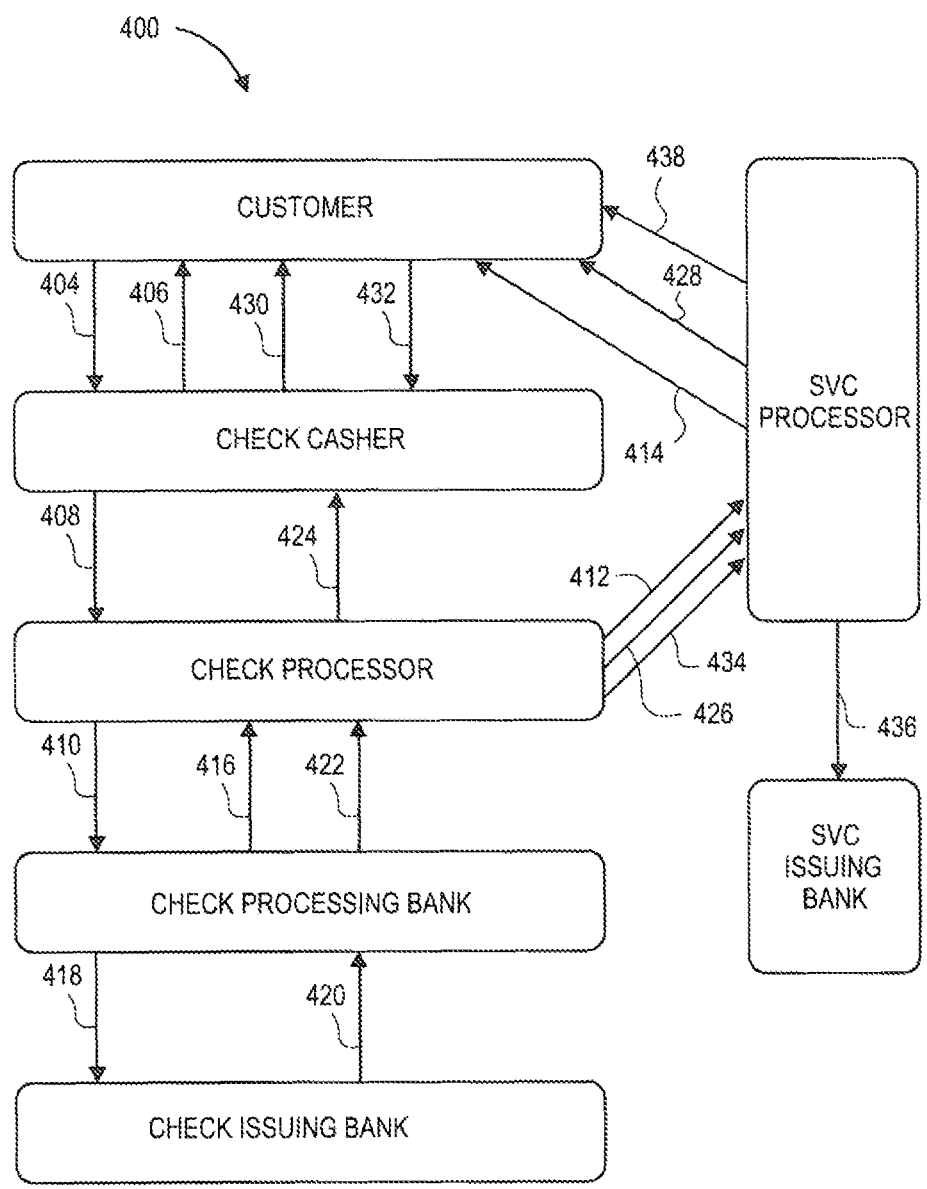
FIG. 4 is a flow diagram illustrating a check processing technique according to various implementations.

FIG. 4 illustrates an exemplary process 400 according to present embodiments. In particular, the process 400 of FIG. 4 details incorporating the use of prepaid cards, SVCs, and the like, in check processing transactions. It should be apparent to those of ordinary skill in the art that the diagram depicted in FIG. 4 represents a generalized illustration and that other processing may be added or existing processing can be removed or modified.

The process 400 begins at 404, where an individual can submit a check to a check casher. For instance, the individual can take a third party check into a check cashing entity. In 406, the check casher can deduct a fee and return a portion of the money amount of the check to the individual. Further, the check casher can place a balance of the money amount on a stored-value card (SVC) and provide the SVC to the customer, with an indication that a portion of the balance is available immediately and a portion of the balance on the SVC will be available on a specified date. In some implementations, the check casher can negotiate with the customer as to how much of the balance will be placed on the SVC, when the balance on the SVC will become available, and other considerations. In implementations, the check casher can provide no money to the customer and can place the full money amount on the SVC, to be made available on the specified date. In 408, the check casher can submit the check to a check processor and request that the balance of the money amount be placed on the customer's SVC. Further, the check processor can credit an account of the check casher with the money amount of the check. In 410, the check processor can submit the check to a check processing bank. In implementations, the check processing bank can be equipped with "Check 21" capabilities.

In 412, the check processor can instruct or otherwise indicate to an SVC processor that the balance of the money amount is a pending deposit that can be made available on a specified date. In some implementations, the check processor can submit a message to the SVC processor that an associated account has a pending deposit and will be available on a specified date, and this message can be displayed whenever the customer performs a balance inquiry. In other implementations, the check processor can submit appropriate funds to the SVC processor to be held until the specified date. In 414, the SVC processor can inform the customer of the pending deposit and when the pending deposit will be made available, as well as the amount of the pending deposit. In implementations, the SVC processor can automatically or manually inform the customer via any type of data communication such as, for example, a text message, phone call, email, and/or similar channel. In 416, the check processing bank can credit the check processor for the money amount of the check. In 418, the check processing bank can submit the check to a check issuing bank for clearance by the check issuing bank. Further, the check issuing bank can, credit the check processing bank for the money amount of the check.

If there are any problems with the check, then in 420, the check issuing bank can return the check to the check processing bank and reverse the credit amount applied to the check processing bank. For example, the check can "bounce" if the drawer of the check has insufficient funds in an applicable account. In 422, the check processing bank can inform the check processor of the returned check and can reverse the credit amount applied to the check processor. In 424, the check processor can inform the check casher of the returned check and can reverse the credit amount applied to the check casher. In 426, the check processor can reverse or otherwise erase the pending deposit associated with the SVC. In implementations, the check processor can notify the SVC processor to delete the pending deposit message. In 428, the SVC processor can notify the customer of the returned check and can instruct or request that the customer return to the check casher to retrieve the returned check. In 430, the check casher can attempt to locate the customer to return the check. If the customer is found, then in 432, the customer can return any cash received from the check casher and can pay any associated returned check fees.

If, however, the elapsed hold time passes, or once the specified date is reached, and the check has not been returned, then in 434, the check processor can submit an instruction to the SVC processor to load the SVC. In some implementations, the check processor can submit the appropriate funds to the SVC processor and can eliminate any pending deposit instructions being sent to the SVC processor. In other implementations, the SVC processor can release the funds already submitted by the check processor. In 436, the' SVC processor can issue an instruction to an SVC issuing bank to load the SVC, and the SVC issuing bank can move funds from a pre-funded account associated with the check processor to an SVC master account, or the like. In 438, the SVC processor can notify the customer of the available funds. In implementations, the SVC processor can notify the customer of the available funds via any type of data communication such as, for example, a text message, phone call, email, and/or similar channel.

Figure 5:
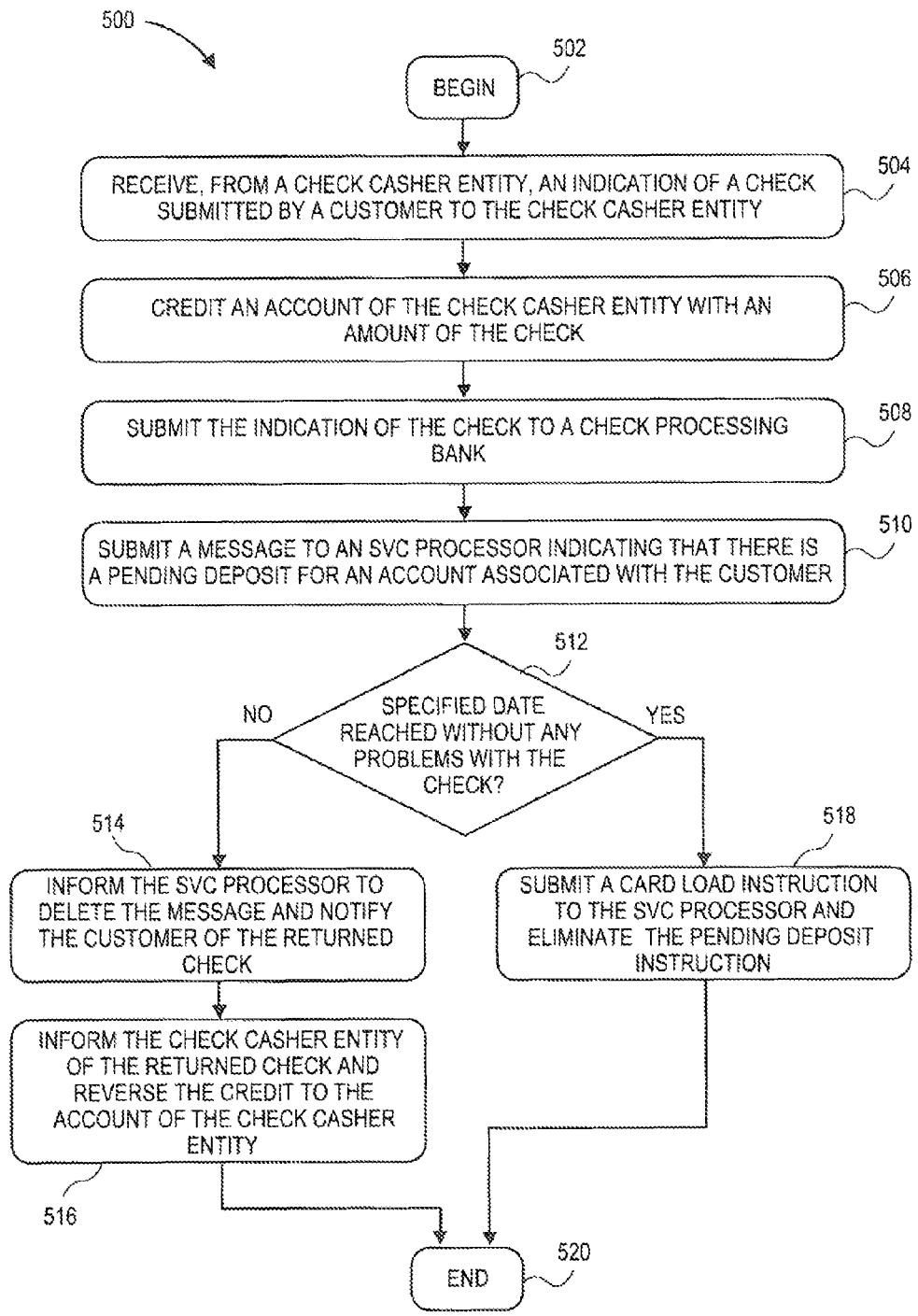
FIG. 5 is a flow diagram illustrating a check processing technique according to various implementations.

FIG. 5 illustrates a flow diagram illustrating a process 500 of incorporating a prepaid card in a check processing transaction. In implementations, the process 500 can be performed by a check processor, such as the check processor 105, or by any other entity or logic in a system. It should be apparent to those of ordinary skill in the art that the diagram depicted in FIG. 5 represents a generalized illustration and that other processing may be added or existing processing can be removed or modified.

In 502, processing can begin. In 504, the check processor can receive, from a check casher entity, an indication, such as an electronic representation, of a check submitted by a customer to the check casher entity. In implementations, the check casher entity can take a fee from an amount of the check, and initiate a processing of the balance of the amount. Further, the check casher entity can provide an SVC to the customer with an indication of the balance and an indication of a date on which the balance will become available. In some implementations, the check casher can load an SVC previously used by the customer. In 506, the check processor can credit an account of the check casher entity with an amount of the check. In 508, the check processor can submit the check to a bank such as, for example, a check processing bank. In implementations, the check processor can receive a credit for the amount of the check from the check processing bank. In 510, the check processor can submit a message to an SVC processor indicating that there is a pending deposit for an account associated with the customer.

In 512, the check processor can determine whether the specified date has been reached without any problems with the check. For example, there are no problems with the check if the check does not "bounce" before the specified date is reached. If there are any problems with the check (514, NO), then the check processor can inform the SVC processor to delete the message and notify the customer of the returned check. In implementations, the check processor can inform the SVC processor to cancel the submitted funds and inform the customer of the returned check. Further, in implementations, the SVC processor can provide instructions to the customer to retrieve the check from the check casher. In 516, the check processor can inform the check casher entity of the returned check and reverse the credit to the account of the check casher entity.

In contrast, if the specified date is reached without any problems with the check (518, YES), then the check processor can submit a card load instruction to the SVC processor and eliminate the pending deposit instruction. In implementations, the SVC processor can issue a load instruction to an SVC issuing bank, which can retrieve funds from an account of the check processor. Further, the SVC processor can notify the customer of the available funds. In 520, the processing can end, repeat, or return to any of the previous steps.

Figure 6:
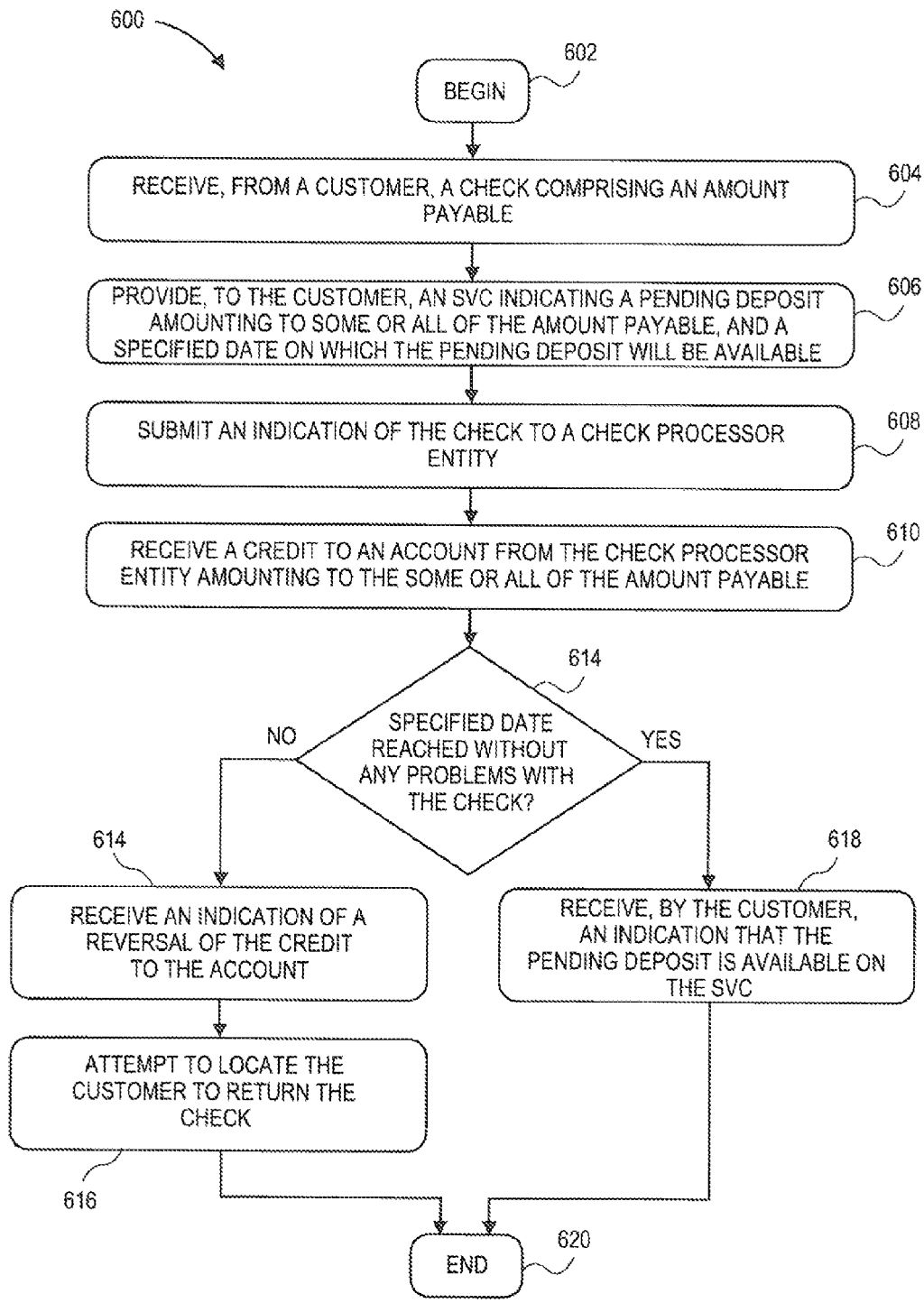
FIG. 6 is a flow diagram illustrating a check processing technique according to various implementations.

FIG. 6 illustrates a flow diagram illustrating a process 600 of incorporating a prepaid card, an SVC card, and/or the like, in a check processing transaction. In implementations, the process 600 can be performed by a check casher entity, such as the check casher 110, or by any other entity or logic in a system. It should be apparent to those of ordinary skill in the art that the diagram depicted in FIG. 6 represents a generalized illustration and that other processing may be added or existing processing can be removed or modified.

In 602, processing can begin. In 604, the check casher can receive, from a customer, a check comprising an amount payable. In 606, the check casher can provide an SVC to the customer or add funds to a previously provided SVC, and cause that SVC to indicate a pending deposit amounting to some or all of the amount payable and a specified date on which the pending deposit will be available. In implementations, the check casher can take a fee from the amount payable of the check, and initiate a processing of the remainder of the amount. In 608, the check casher can submit an indication of the check to a check processor entity. For example, the check casher can submit an electronic version of the check to the check processor entity. In 610, the check casher can receive a credit to an account from the check processor entity that amounts to some or all of the amount payable. For example, once the check casher submits the indication of the check to the check processor entity, the check processor entity can credit the account of the check casher.

In 612, the check casher can determine whether the specified date has been reached without any problems with the check. For example, there are no problems with the check if the check does not "bounce" before the specified date is reached. If there are any problems with the check (614, NO), then the check casher can receive an indication of a reversal of the credit to the account. In implementations, the check processor can reverse the credit to the account. Further, in 616, the check casher can attempt to locate the customer to return the check. For example, the check casher can attempt to locate the customer via any type of data communication (e.g., text message, e-mail, phone call, and/or others), and, if the customer is found, the check casher can request that the customer return any monies received and/or pay any associated returned check fees.

In contrast, if the specified date is reached without any problems with the check (618, YES), then the customer can receive an indication that the pending deposit is available on the SVC. In implementations, the check processor or SVC processor can notify the customer of the available deposit on the SVC. In 620, the processing can end, repeat, or return to any of the previous steps.

FIG. 7 illustrates an exemplary block diagram of a computing system 700 which can be implemented to store and execute processing modules associated with any and components of the check processing environment 100, according to various implementations. In embodiments, the processing modules can be stored and executed on the computing system 700 in order to perform the systems and methods as described herein. The computing systems 700 can represent an example of any computing systems in the check processing environment 100. While FIG. 7 illustrates various components of the computing system 700, one skilled in the art will realize that existing components can be removed or additional components can be added.

As shown in FIG. 7, the computing system 700 can comprise one or more processors, such as a processor 702 that provide an execution platform for embodiments of the processing modules. Commands and data from the processor 702 can be communicated over a communication bus 704. The computing system 700 can also comprise a main memory 706, for example, one or more computer readable storage media such as a Random Access Memory (RAM), where the processing modules and other application programs, such as an operating system (OS) can be executed during runtime, and can comprise a secondary memory 708. The secondary memory 708 can comprise, for example, one or more computer readable storage media or devices such as a hard disk drive 710 and/or a removable storage drive 712, representing a floppy diskette drive, a magnetic tape drive, a compact disk drive, etc., where a copy of an application program embodiment for the processing modules can be stored. The removable storage drive 712 reads from and/or writes to a removable storage unit 714 in a well-known manner. The computing system 700 can also comprise a network interface 716 in order to connect with any type of network, whether wired or wireless.

In embodiments, a user can interface with the computing system 700 and operate the processing modules with a keyboard 718, a mouse 720, and/or a display 722. To provide information from the computing system 700 and data from the processing modules, the computing system 700 can comprise a display adapter 724. The display adapter 724 can interface with the communication bus 704 and the display 722. The display adapter 724 can receive display data from the processor 702 and convert the display data into display commands for the display 722.

The foregoing description is illustrative, and variations in configuration and implementation may occur to persons skilled in the art. For instance, the various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the elements described herein can also be included within the scope of computer-readable media.

The processing of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

What is claimed is:

1. A method of check processing, comprising:
   receiving, from a check casher entity, an indication of a check submitted by a customer to the check casher entity, end a request for a pending deposit to be placed on a stored-value card associated with the customer;
   notifying a card processor entity of the pending deposit to be placed on the stored-value card and a specified date on which at least a portion of the pending deposit will be available;
   notifying the card processor entity of a date different from the specified date on which another portion of the pending deposit to be placed on the stored-value card will be available;
   determining, prior to the specified date, whether an indication that the check did not clear has been received;
   in direct response to receiving, prior to the specified date, the indication that the check did not clear, instructing the card processor entity to reverse the pending deposit to be placed on the stored-value card and notify the customer that check did not clear; and
   if the indication has not been received by the specified date, instructing the card processor entity to submit an immediate load in amount equal to the at least a portion of the pending deposit to be placed on the stored-value card and eliminate the pending deposit.

2. The method of claim 1, wherein instructing the card processor entity to submit the immediate load further comprises:
   instructing the card processor entity to notify the customer that the immediate load is available.

3. The method of claim 1, wherein instructing the card processor entity to reverse the pending deposit to be place on the stored-value card further comprises: instructing the card processor entity to instruct the customer to retrieve the check from the check casher entity.

4. The method of claim 1, wherein notifying the card processor entity of the pending deposit to be placed on the stored-value card comprises: submitting a message to the card processor entity indicating that the pending deposit is associated with an account of the customer.

5. The method of claim 1, wherein notifying the card processor entity of the pending deposit to be placed on the stored-value card comprises: submitting, to the card processor entity, funds equal to the pending deposit, wherein the funds are to be held until the specified date.

6. A system for check processing, comprising:
   a processor; and
   a computer readable storage medium coupled to the processor and comprising instructions for causing the processor to perform actions comprising:
      receiving, from a check casher entity, an indication of a check submitted by a customer to the check casher entity, and a request for a pending deposit to be placed on a stored-value card associated with the customer;
      notifying a card processor entity of the pending deposit to be placed on the stored-value card and a specified date on which at least a portion of the pending deposit will be available;
      notifying the card processor entity of a date different from the specified date on which another portion of the pending deposit to be placed on the stored-value card will be available;
      determining prior to the specified date, whether an indication that the check did not clear has been received;
      in direct response to receiving, prior to the specified date, the indication that the check did not clear, instructing the card processor entity to reverse the pending deposit to placed on the stored-value card, and notify the customer that the check did not clear; and
      if the indication has not been received by the specified date, instructing the card processor entity to submit an immediate load in an amount equal to the at least a portion of the pending deposit to be placed on the stored-value card and eliminate the pending deposit.

7. The system of claim 6, wherein instructing the card processor entity to submit the immediate load further comprises:
   instructing the card processor entity to notify the customer that the immediate load is available.

8. The system of claim 6, wherein instructing the card processor entity to reverse the pending deposit to be placed on the stored-value card further comprises:
   instructing the card processor entity to instruct the customer to retrieve the check from the check casher entity.

9. The system of claim 6, wherein notifying the card processor entity of the pending deposit to be placed on the stored-value card comprises:
   submitting a message to the card processor entity indicating that the pending deposit is associated with an account of the customer.

10. The system of claim 6, wherein notifying the card processor entity of the pending deposit to be placed on the stored-value card comprises:
    submitting, to the card processor entity, funds equal to the pending deposit, wherein the funds are to be held until the specified date.

11. A method of check processing, comprising:
    receiving, from a customer, a check, comprising an amount payable;
    providing, to the customer, a stored-value card indicating a pending deposit amounting to some or all of the amount payable, an indication of a specified date on which at least a portion of the pending deposit will be available, and an indication of a date different from the specified date on which another portion of the pending deposit will be available;

submitting, by a processor, a request to process the check to a check processor entity;

determining, prior to the specified date, whether an indication that the check did not clear has been received;

determining, prior to the specified date, whether a reversal indication from the check processor entity has been received, wherein the reversal indicates that the pending deposit with the stored-value card has been reversed based on a determination that the check did not clear prior the specified date;

in direct response to receiving the reversal indication, notifying the customer that the pending deposit associated with the stored-value card has been reversed; and if the reversal indication has not been received by the specified date, availing the at least a portion of the pending deposit associated with the stored-value card to the customer.

12. The method of claim 11, wherein notifying the customer further comprises:

attempting to locate the customer to return the check.

13. The method of claim 11, wherein submitting a request to process the check to the cheek processor entity further comprises:

transmitting, by the processor, a digital version of the check, to the check processor entity.

14. The method of claim 11, further comprising:

submitting, to the check processor entity, a request to place the pending deposit on the stored-value card.

* * * * *